United States Patent
Hu et al.

(10) Patent No.: US 12,556,260 B2
(45) Date of Patent: Feb. 17, 2026

(54) METHODS AND APPARATUS FOR BEAM FAILURE RECOVERY FOR SIDELINK UNICAST COMMUNICATIONS

(71) Applicant: Lenovo (Beijing) Limited, Beijing (CN)

(72) Inventors: Jie Hu, Changping District (CN); Jing Han, Chaoyang District (CN); Haiming Wang, Xicheng District (CN); Lianhai Wu, Chaoyang (CN); Jie Shi, Haidian District (CN); Ran Yue, Haidian District (CN)

(73) Assignee: Lenovo (Beijing) Limited, Beijing (CN)

( * ) Notice: Subject to any disclaimer, the term of this patent is extended or adjusted under 35 U.S.C. 154(b) by 397 days.

(21) Appl. No.: 18/041,453

(22) PCT Filed: Aug. 21, 2020

(86) PCT No.: PCT/CN2020/110508
§ 371 (c)(1),
(2) Date: Feb. 13, 2023

(87) PCT Pub. No.: WO2022/036687
PCT Pub. Date: Feb. 24, 2022

(65) Prior Publication Data
US 2023/0300935 A1    Sep. 21, 2023

(51) Int. Cl.
*H04B 7/06*   (2006.01)
*H04W 76/19*  (2018.01)

(52) U.S. Cl.
CPC ....... *H04B 7/06964* (2023.05); *H04B 7/0626* (2013.01); *H04W 76/19* (2018.02)

(58) Field of Classification Search
CPC . H04W 76/19; H04B 7/0626; H04B 7/06964; H04B 7/06954; H04B 7/0695
See application file for complete search history.

(56) References Cited

U.S. PATENT DOCUMENTS

| | | | |
|---|---|---|---|
| 12,149,318 B2* | 11/2024 | Tsai | H04B 7/06964 |
| 2019/0379506 A1* | 12/2019 | Cheng | H04B 7/022 |

(Continued)

FOREIGN PATENT DOCUMENTS

| | | |
|---|---|---|
| CN | 110536429 A | 12/2019 |
| EP | 3681229 A1 | 7/2020 |
| WO | 2020057760 A1 | 3/2020 |

OTHER PUBLICATIONS

PCT/CN2020/110508, "International Preliminary Report on Patentability", PCT Application No. PCT/CN2020/110508, Mar. 2, 2023, 5 pages.

(Continued)

*Primary Examiner* — Harry H Kim
(74) *Attorney, Agent, or Firm* — FIG. 1 Patents

(57) ABSTRACT

Embodiments of the present disclosure relate to methods and apparatus for beam failure recovery for sidelink unicast communications. According to an embodiment of the present disclosure, a method performed by a first user equipment (UE) for wireless communication may include: in response to detecting a beam failure on sidelink between the first UE and a second UE, transmitting a beam failure recovery query (BFRQ) to the second UE on at least one candidate beam; and in response to receiving a beam failure recovery response (BFRR) from the second UE, selecting one or more new beams for sidelink transmission based on the BFRR.

20 Claims, 3 Drawing Sheets

(56) References Cited

U.S. PATENT DOCUMENTS

| | | |
|---|---|---|
| 2020/0252990 A1 | 8/2020 | Ganesan et al. |
| 2021/0368403 A1* | 11/2021 | Wu ...................... H04W 76/30 |
| 2022/0053398 A1* | 2/2022 | Matsumura ............ H04B 7/088 |
| 2022/0123823 A1* | 4/2022 | Dong ................... H04B 7/0695 |
| 2022/0141814 A1* | 5/2022 | Fan .................... H04B 7/06964 |
| | | 370/329 |
| 2022/0149918 A1* | 5/2022 | Miao ...................... H04B 7/088 |
| 2022/0173788 A1* | 6/2022 | Kang ..................... H04B 7/088 |
| 2022/0191755 A1* | 6/2022 | Ohlsson .......... H04W 36/00835 |
| 2022/0399927 A1* | 12/2022 | Tsai .................... H04B 7/0695 |
| 2023/0036526 A1* | 2/2023 | Ryu ..................... H04W 16/28 |
| 2025/0038820 A1* | 1/2025 | Tsai .................. H04B 7/06964 |

OTHER PUBLICATIONS

PCT/CN2020/110508, "International Search Report and Written Opinion", PCT Application No. PCT/CN2020/110508, May 20, 2021, 6 pages.

\* cited by examiner

METHODS AND APPARATUS FOR BEAM FAILURE RECOVERY FOR SIDELINK UNICAST COMMUNICATIONS

TECHNICAL FIELD

Embodiments of the present disclosure are related to wireless communication technologies, and more particularly, related to methods and apparatuses for beam failure recovery for sidelink unicast communications.

BACKGROUND

In a new radio (NR) communication system, sidelink communications may require a high data rate. To meet the high data rate requirement, the large spectrum in FR2 (24,250 MHz-52,600 MHz) has been discussed to be introduced in NR sidelink communications to improve the data rate especially for commercial sidelink transmission. When the spectrum in FR2 is applied, beam management (e.g., beam establishment, panel selection, beam failure detection and recovery, etc.) for sidelink transmission in FR2 becomes a quite important issue for unicast transmission.

SUMMARY OF THE DISCLOSURE

Embodiments of the present disclosure provide solutions at least for beam failure recovery for sidelink unicast communications.

According to an embodiment of the present disclosure, a method performed by a first user equipment (UE) for wireless communication may include: in response to detecting a beam failure on sidelink between the first UE and a second UE, transmitting a beam failure recovery query (BFRQ) to the second UE on at least one candidate beam; and in response to receiving a beam failure recovery response (BFRR) from the second UE, selecting one or more new beams for sidelink transmission based on the BFRR.

According to another embodiment of the present disclosure, a method performed by a first UE for wireless communication may include: receiving a BFRQ from a second UE on at least one candidate beam; transmitting a BFRR to the second UE in response to the BFRQ; and determining one or more new beams for sidelink reception based on the BFRQ.

According to still another embodiment of the present disclosure, an apparatus may include: at least one non-transitory computer-readable medium having stored thereon computer executable instructions; at least one receiving circuitry; at least one transmitting circuitry; and at least one processor coupled to the at least one non-transitory computer-readable medium, the at least one receiving circuitry and the at least one transmitting circuitry. The computer executable instructions may cause the at least processor to implement a method according to any embodiment of the present disclosure.

The details of one or more examples are set forth in the accompanying drawings and the description below. Other features, objects, and advantages will be apparent from the description and drawings, and from the claims.

BRIEF DESCRIPTION OF THE DRAWINGS

In order to describe the manner in which advantages and features of the present disclosure can be obtained, a description of the present disclosure is rendered by reference to specific embodiments thereof which are illustrated in the appended drawings. These drawings depict only exemplary embodiments of the present disclosure and are not therefore intended to limit the scope of the present disclosure.

DETAILED DESCRIPTION

The detailed description of the appended drawings is intended as a description of the currently preferred embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

In the following description, numerous specific details are provided, such as examples of programming, software modules, network transactions, database structures, hardware modules, hardware circuits, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference will now be made in detail to some embodiments of the present disclosure, examples of which are illustrated in the accompanying drawings. To facilitate understanding, embodiments are provided under specific network architecture and new service scenarios, such as 3rd Generation Partnership Project (3GPP) 5G, 3GPP Long Term Evolution (LTE) and so on. Persons skilled in the art know very well that, with the development of network architecture and new service scenarios, the embodiments in the present disclosure are also applicable to similar technical problems; and moreover, the terminologies recited in the present disclosure may change, which should not affect the principle of the present disclosure.

Figure 1:
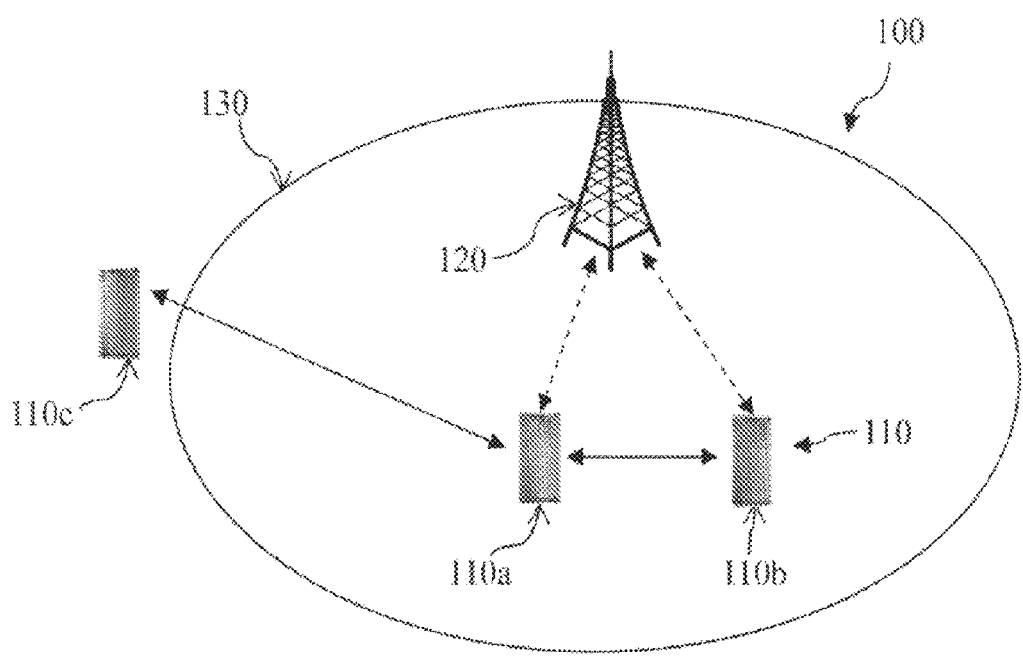
FIG. 1 illustrates a schematic diagram of a wireless communication system according to some embodiments of the present disclosure.

FIG. 1 illustrates a schematic diagram of a wireless communication system 100 according to some embodiments of the present disclosure.

As shown in FIG. 1, a wireless communication system 100 may include at least one base station (BS), e.g., BS 120, and at least one UE 110, e.g., UE 110a, UE 110b, and UE 110c. Although a specific number of UEs 110 and one BS 120 are depicted in FIG. 1, it is contemplated that wireless communication system 100 may also include more BSs and more or fewer UEs in and outside of the coverage of the BSs.

The wireless communication system 100 can be compatible with any type of network that is capable of sending and receiving wireless communication signals. For example, the wireless communication system 100 can be compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

The UEs 110 and the BS 120 may support communication based on, for example, 3G, LTE, LTE-advanced (LTE-A), NR, or other suitable protocol(s). In some embodiments of the present disclosure, the BS 120 may also be referred to as an access point, an access terminal, a base, a macro cell, a node-B, an enhanced node B (eNB), a gNB, a home node-B, a relay node, or a device, or described using other terminology used in the art. The UE 110a, UE 110b, or UE 110c may include, for example, but is not limited to, a computing device, a wearable device, a mobile device, an IoT (Internet of Things) device, a vehicle, etc. Moreover, the UE 110a, UE 110b, or UE 110c may be referred to as a subscriber unit, a mobile, a mobile station, a user, a terminal, a mobile terminal, a wireless terminal, a subscriber station, a user terminal, or a device, or described using other terminology used in the art. Persons skilled in the art should understand that as technology develops and advances, the terminologies described in the present disclosure may change, but should not affect or limit the principles and spirit of the present disclosure.

The BS 120 may define one or more cells, and each cell may have a coverage area 130. In the exemplary wireless communication system 100, some UEs (e.g., UE 110a and UE 110b) are within the coverage of the BS 120, which may not be a specific BS 120 shown in FIG. 1 and can be any one of the BSs 120 in a wireless communication system, and some UEs (e.g., UE 110c) are outside of the coverage of the BS 120. For example, in the case that the wireless communication system includes two BSs 120, a UE 110 being within the coverage of any one of the two BSs 120 means that the UE 110 is within the coverage of a BS 120 (i.e., in-coverage) in the wireless communication system; and a UE 110 being outside of the coverage of both BSs 120 means that UE 110 is outside of the coverage of a BS 120 (i.e., out-of-coverage) in the wireless communication system.

Still referring to FIG. 1, the UE 110a and UE 110b may communicate with the BS 120 via, for example, a Uu link (denoted by dotted arrow in FIG. 1). The UE 110a, UE 110b, and UE 110c may communicate with each other (e.g., UE 110a may communicate with UE 110b, or UE 110a may communicate with UE 110c) via a sidelink (denoted by solid arrow in FIG. 1), and may form a UE group. During a sidelink communication, a transmitting UE (hereinafter referred to as a "Tx UE") may transmit signaling, data, or both to a receiving UE (hereinafter referred to as an "Rx UE"). For example, referring to FIG. 1, a Tx UE (e.g., UE 110a) may transmit data to an Rx UE (e.g., UE 110b or UE 110c).

Beam management has been designed for the NR Uu link. For beam failure detection, a BS may configure a UE with beam failure detection reference signals (e.g., synchronization signal block (SSB) or channel state information reference signal (CSI-RS)), which are normally periodic. Based on measurements of the beam failure detection reference signals, the physical (PHY) layer may provide beam failure instance indications to the medium access control (MAC) layer at the UE side. The UE may declare a beam failure when the number of beam failure instance indications from the PHY layer to the MAC layer reaches a configured threshold before a configured timer expires. The SSB-based beam failure detection is based on the SSB associated with the initial downlink (DL) bandwidth part (BWP) and can only be configured for the initial DL BWP and for DL BWPs containing the SSB associated with the initial DL BWP. For other DL BWPs, beam failure detection can only be performed based on CSI-RS. When a beam failure is detected, the UE may trigger beam failure recovery by initiating a random-access procedure on the primary cell (PCell), and select a suitable beam to perform beam failure recovery (if the BS has provided dedicated random-access resources for certain beams, those beams will be prioritized by the UE). Upon completion of the random-access procedure, beam failure recovery is considered completed.

When the large spectrum in FR2 is applied to the NR sidelink, beam management should be considered for sidelink unicast transmission. However, periodic beam failure detection reference signals are not supported in NR sidelink for both Tx UE and Rx UE sides. Thus, beam failure instance indications from the PHY layer to the MAC layer are not available for sidelink beam failure detection. A beam failure detection and recovery procedure different from that for the NR Uu link is needed to be designed for the NR sidelink.

According to some embodiments of the present disclosure, a beam failure recovery configuration (e.g., sl-BeamFailureRecoveryConfig) can be used to configure a Tx UE to implement sidelink beam failure detection and recovery. The beam failure recovery configuration can be configured by radio resource control (RRC) dedicated signaling or system information block (SIB) signaling, or be preconfigured in the Tx UE. The beam failure recovery configuration may include information configuring candidate beams, corresponding resources, a recovery timer (e.g., slbeamFailureRecovertimer), etc., for sidelink beam failure recovery.

For a Tx UE which is not configured or preconfigured with the beam failure recovery configuration, it can implement sidelink radio link failure (RLF) detection rather than beam failure detection. For example, a sidelink RLF can be declared when one of the following conditions is met:

the number of retransmissions from a sidelink radio link control (RLC) entity of the Tx UE for a specific destination (e.g., an Rx UE) reaches a first maximum number;

the number of consecutive hybrid automatic repeat request (HARM) discontinuous transmissions (DTXs) or non-acknowledgement (NACK) feedbacks received by a sidelink MAC entity of the Tx UE from a specific destination (e.g., an Rx UE) reaches a second maximum number;

a configured or preconfigured RLF timer (e.g., T400) expires; or an integrity check failure indication concerning sidelink signaling radio bear (SL-SRB) (e.g., SL-SRB2 or SL-SRB3) is received from a sidelink packet data convergence protocol (PDCP) entity.

According to some embodiments of the present disclosure, a Tx UE configured or preconfigured with the beam failure recovery configuration may detect a beam failure on sidelink and trigger a beam failure declaration when one of the following conditions is met:

the number of retransmissions from a sidelink RLC entity of the Tx UE for a specific destination (e.g., an Rx UE) reaches a first threshold;

the number of consecutive HARQ DTXs or NACK feedbacks received from a specific destination (e.g., an Rx UE) reaches a second threshold; or a configured or preconfigured detection timer expires.

In an embodiment of the present disclosure, the first threshold is lower than the first maximum number for sidelink RLF detection, the second threshold is lower than the second maximum number for sidelink RLF detection, and the detection timer is shorter than the RLF timer for sidelink RLF detection. The Tx UE may start the detection timer after transmitting a sidelink access stratum configuration message (e.g., RRCReconfigurationSidelink) or a CSI-RS to an Rx UE. When receiving a response (e.g., RRCReconfigurationFailureSidelink or RRCReconfigurationCompleteSidelink) to the sidelink access stratum configuration message or a CSI report from the Rx UE before the detection timer expires, the Tx UE may stop the detection timer.

When a Tx UE detects a beam failure on sidelink between the Tx UE and an Rx UE, the Tx UE may initiate a beam failure recovery procedure on the sidelink.

Figure 2:
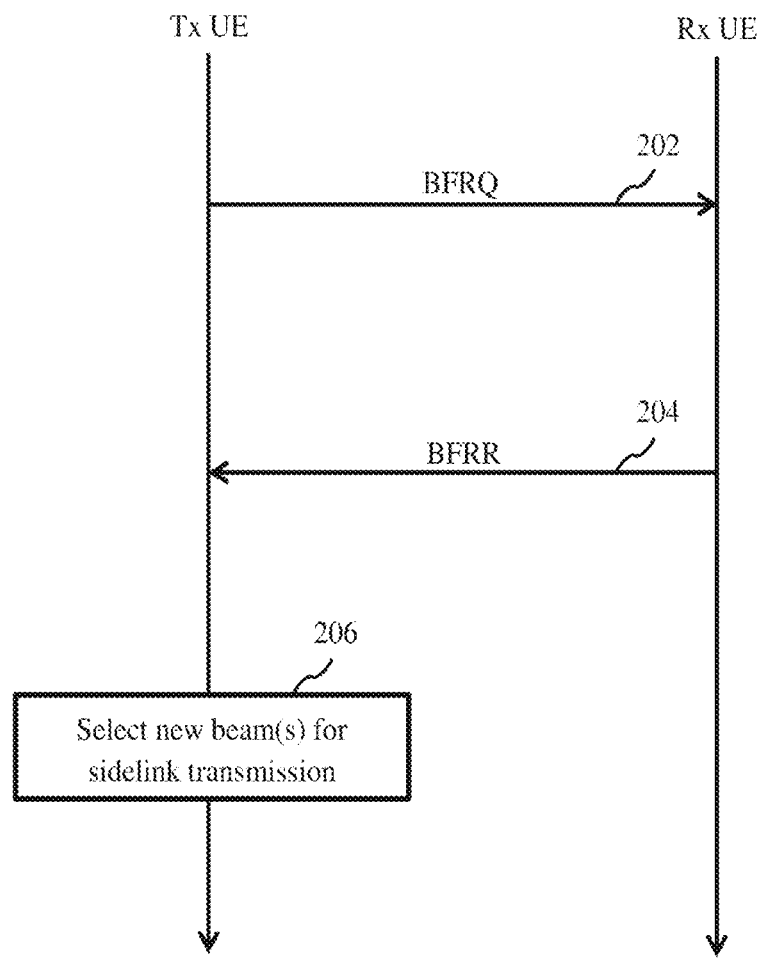
FIG. 2 illustrates a flow chart of an exemplary beam failure recovery procedure for sidelink unicast communications according to some embodiments of the present disclosure.

FIG. 2 illustrates a flow chart of an exemplary beam failure recovery procedure for sidelink unicast communications according to some embodiments of the present disclosure.

In response to detecting a beam failure on sidelink between a Tx UE and an Rx UE (e.g., when one of the conditions described above is met), the Tx UE may transmit a beam failure recovery query (BFRQ) to the Rx UE on at least one candidate beam at step 202. The BFRQ can be carried in an RRC signaling or a MAC layer control element (CE).

The BFRQ may include a beam failure indication (e.g., 1-bit indication) to inform the Rx UE that a beam failure happens. The beam failure indication can be transmitted on each of the at least one candidate beam.

The BFRQ may further include CSI-RS(s) corresponding to the at least one candidate beam. A CSI-RS transmitted on a corresponding candidate beam can trigger a responding CSI report from the Rx UE to the Tx UE.

A set of candidate beams can be configured or preconfigured for the Tx UE, e.g., by the beam failure recovery configuration. The at least one candidate beam on which the BFRQ is transmitted is selected from the set of configured or preconfigured candidate beams. In an embodiment of the present disclosure, the Tx UE may transmit the BFRQ on each candidate beam in the set of configured or preconfigured candidate beams. In another embodiment of the present disclosure, for each beam that declares beam failure, the Tx UE may select one candidate beam from the set of configured or preconfigured candidate beams for transmission of the BFRQ. For example, the candidate beam can be selected based on UE implementation. When more than one beam declares beam failure, the Tx UE may select more than one candidate beam for transmission of the BFRQ.

In order to receive the BFRQ transmitted on the at least one candidate beam, the Rx UE needs to monitor sidelink transmission(s) on the set of configured or preconfigured candidate beams (i.e., performing reception using the set of configured or preconfigured candidate beams) before beam failure declaration. According to some embodiments of the present disclosure, when the Rx UE should start or stop the monitoring of the set of configured or preconfigured candidate beams can be configured by a BS or the TX UE or be preconfigured. In an embodiment of the present disclosure, the BS or Tx UE may transmit an indication to the Rx UE to perform reception using the set of configured or preconfigured candidate beams ergodically within a specified time window or periodically before beam failure declaration when one of the following conditions is met:

a CSI measurement (e.g., a reference signal received power (RSRP)) corresponding to a received CSI-RS is lower than a threshold; or a number of consecutive NACK feedbacks transmitted by the Rx UE reaches a threshold.

The Rx UE may perform sidelink reception on an original beam while simultaneously performing reception using the set of configured or preconfigured candidate beams, as configured by the BS or Tx UE, until the Rx UE receives the BFRQ from the Tx UE on at least one candidate beam or stops reception using the set of configured or preconfigured candidate beams as configured by the BS or Tx UE.

After receiving the BFRQ from the Tx UE on at least one candidate beam, the Rx UE may measure a CSI measurement (e.g., CSI-RSRP) for each CSI-RS included in the received BFRQ corresponding to each of the at least one candidate beam, and transmit a beam failure recovery response (BFRR) to the Tx UE in response to the BFRQ at step 204. The BFRR may include at least one CSI report, and each CSI report indicates a CSI measurement corresponding to a candidate beam.

According to some embodiments of the present disclosure, in the cases that the Tx UE transmits the BFRQ on each candidate beam in the set of configured or preconfigured candidate beams, the Rx UE may store a beam index corresponding to the optimal CSI measurement among all the measured CSI measurements. The Rx UE will use the candidate beam with the stored beam index as a new beam for sidelink reception. When more than one beam declares beam failure, the Rx UE may store more than one beam index corresponding to more than one optimal CSI measurement and use more than one candidate beam with the stored beam indexes as new beams for sidelink reception.

In an embodiment of the present disclosure, the BFRR transmitted by the Rx UE may include CSI report(s) corresponding to all the candidate beam(s) on which the BFRQ is received. In another embodiment of the present disclosure, the BFRR transmitted by the Rx UE may only include CSI report(s) corresponding to the stored beam index(es), which correspond to the optimal CSI measurement(s).

According to some embodiments of the present disclosure, in the cases that the Tx UE only transmits the BFRQ on the Tx UE selected candidate beam(s), the Rx UE may store the beam index(es) corresponding to the Tx UE selected candidate beam(s) and use the Tx UE selected candidate beam(s) as new beam(s) for sidelink reception. The BFRR transmitted by the Rx UE may only include CSI report(s) corresponding to the Tx UE selected candidate beam(s).

In response to receiving the BFRR from the Rx UE, the Tx UE may select one or more new beams for sidelink transmission based on the BFRR at step 206. Then the beam failure recovery is considered completed.

In the cases that the Rx UE transmits CSI report(s) corresponding to all the candidate beam(s) on which the BFRQ is received, the Tx UE may use candidate beam(s) corresponding to the CSI report(s) indicating the optimal CSI measurement(s) as the new beam(s) for sidelink transmission.

In the cases that the Rx UE only transmits CSI report(s) corresponding to the beam index(es) stored at the Rx UE, the Tx UE may use candidate beam(s) corresponding to the received CSI report(s) as the new beam(s) for sidelink transmission.

In the cases that the Rx UE only transmits CSI report(s) corresponding to the Tx UE selected candidate beam(s), the Tx UE may use the selected candidate beam(s) as the new beam(s) for sidelink transmission.

According to some embodiments of the present disclosure, the Tx UE may start a configured or preconfigured recovery timer (e.g., slbeamFailureRecovertimer) after transmitting the BFRQ to the Rx UE on the at least one candidate beam, and monitor the BFRR on the at least one candidate beam while the recovery timer is running. When receiving the BFRR from the Rx UE before the recovery timer expires, the Tx UE may stop the recovery timer. When no BFRR is received before the recovery timer expires, the Tx UE may declare an RLF. According to some embodiments of the present disclosure, the Tx UE may declare an RLF when all the candidate beams in the set of configured or preconfigured candidate beams declare beam failure.

Figure 3:
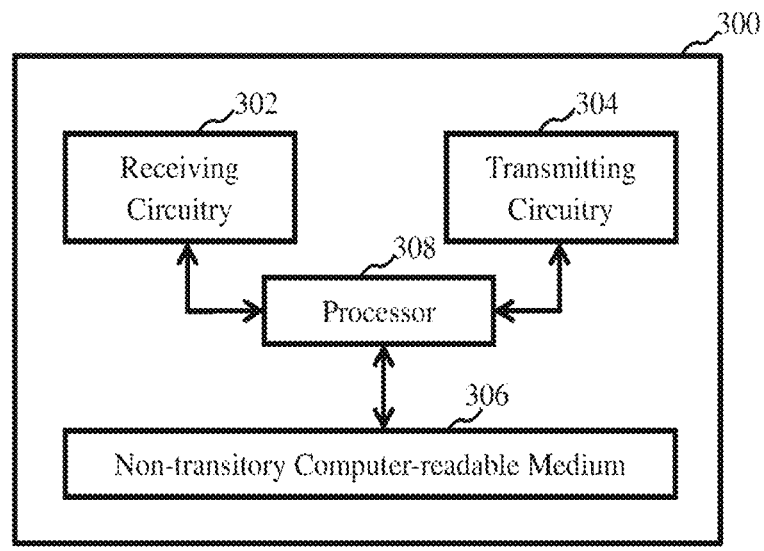
FIG. 3 illustrates an exemplary block diagram of an apparatus according to some embodiments of the present disclosure.

FIG. 3 illustrates an exemplary block diagram of an apparatus 300 according to some embodiments of the present disclosure. In some embodiments of the present disclosure, the apparatus 300 may be or include a Tx UE or other devices having similar functionality. In some embodiments, the apparatus 300 can be configured to perform the method illustrated in FIG. 2.

As shown in FIG. 3, the apparatus 300 may include at least one receiving circuitry 302, at least one transmitting circuitry 304, at least one non-transitory computer-readable medium 306, and at least one processor 308 coupled to the at least one receiving circuitry 302, the at least one transmitting circuitry 304, the at least one non-transitory computer-readable medium 306. While shown to be coupled to each other via the at least one processor 308 in the example of FIG. 3, the at least one receiving circuitry 302, the at least one transmitting circuitry 304, the at least one non-transitory computer-readable medium 306, and the at least one processor 308 may be coupled to one another in various arrangements. For example, the at least one receiving circuitry 302, the at least one transmitting circuitry 304, the at least one non-transitory computer-readable medium 306, and the at least one processor 308 may be coupled to each other via one or more local buses (not shown for simplicity).

Although in FIG. 3, elements such as receiving circuitry 302, transmitting circuitry 304, non-transitory computer-readable medium 306, and processor 308 are described in the singular, the plural is contemplated unless limitation to the singular is explicitly stated. In some embodiments of the present disclosure, the at least one receiving circuitry 302 and the at least one transmitting circuitry 304 may be combined into a single device, such as a transceiver. In certain embodiments of the present disclosure, the apparatus 300 may further include an input device, a memory, and/or other components.

In some embodiments of the present disclosure, the at least one non-transitory computer-readable medium 306 may have stored thereon computer-executable instructions which are programmed to cause the at least one processor 308 to implement the steps of the methods according to embodiments of the present disclosure, for example as described in view of FIG. 2, with the at least one receiving circuitry 302 and the at least one transmitting circuitry 304. For example, when executed, the instructions may cause the at least one processor 308 to transmit, with the at least one transmitting circuitry 304, a BFRQ to a second UE on at least one candidate beam in response to detecting a beam failure on sidelink between the apparatus 300 and the second UE. The instructions may further cause the at least one processor 308 to, in response to receiving a BFRR from the second UE, select one or more new beams for sidelink transmission based on the BFRR.

Figure 4:
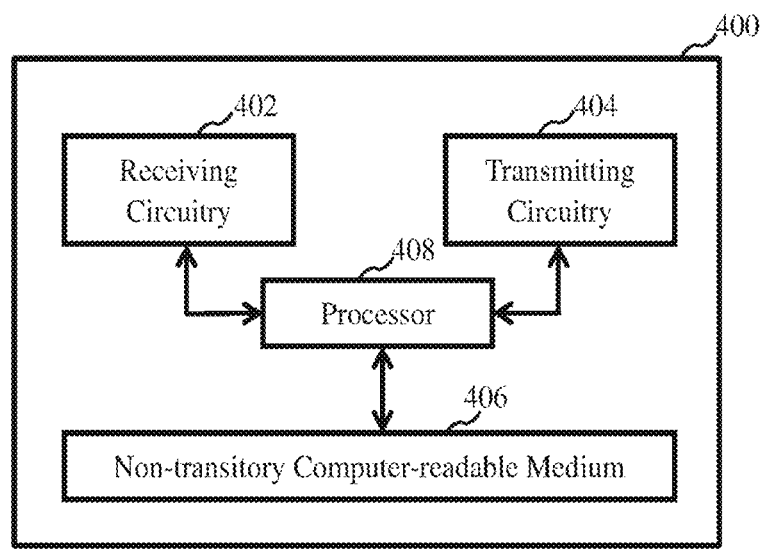
FIG. 4 illustrates an exemplary block diagram of another apparatus according to some embodiments of the present disclosure.

FIG. 4 illustrates an exemplary block diagram of an apparatus 400 according to some embodiments of the present disclosure. In some embodiments of the present disclosure, the apparatus 400 may be or include an Rx UE or other devices having similar functionality. In some embodiments, the apparatus 400 can be configured to perform the method illustrated in FIG. 2.

As shown in FIG. 4, the apparatus 400 may include at least one receiving circuitry 402, at least one transmitting circuitry 404, at least one non-transitory computer-readable medium 406, and at least one processor 408 coupled to the at least one receiving circuitry 402, the at least one transmitting circuitry 404, the at least one non-transitory computer-readable medium 406. While shown to be coupled to each other via the at least one processor 408 in the example of FIG. 4, the at least one receiving circuitry 402, the at least one transmitting circuitry 404, the at least one non-transitory computer-readable medium 406, and the at least one processor 408 may be coupled to one another in various arrangements. For example, the at least one receiving circuitry 402, the at least one transmitting circuitry 404, the at least one non-transitory computer-readable medium 406, and the at least one processor 408 may be coupled to each other via one or more local buses (not shown for simplicity).

Although in FIG. 4, elements such as receiving circuitry 402, transmitting circuitry 404, non-transitory computer-readable medium 406, and processor 408 are described in the singular, the plural is contemplated unless limitation to the singular is explicitly stated. In some embodiments of the present disclosure, the at least one receiving circuitry 402 and the at least one transmitting circuitry 404 may be combined into a single device, such as a transceiver. In certain embodiments of the present disclosure, the apparatus 400 may further include an input device, a memory, and/or other components.

In some embodiments of the present disclosure, the at least one non-transitory computer-readable medium 406 may have stored thereon computer-executable instructions which are programmed to cause the at least one processor 408 to implement the steps of the methods according to embodiments of the present disclosure, for example as described in view of FIG. 2, with the at least one receiving circuitry 402 and the at least one transmitting circuitry 404. For example, when executed, the instructions may cause the at least one processor 408 to receive, with the at least one receiving circuitry 402, a BFRQ from a second UE on at least one candidate beam. The instructions may further cause the at least one processor 408 to transmit, with the at least one transmitting circuitry 404, a BFRR to the second UE in response to the BFRQ.

As will be appreciated by one skilled in the art, aspects of the embodiments may be embodied as a system, apparatus, method, or a program product. Accordingly, embodiments may take the form of an all-hardware embodiment, an all-software embodiment (including firmware, resident software, micro-code, etc.) or an embodiment combining software and hardware aspects.

For example, the disclosed embodiments may be implemented as a hardware circuit comprising custom very-large-scale integration (VLSI) circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, or program code. The storage devices may be tangible, non-transitory, or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but is not limited to being, an electronic, magnetic, optical, electromagnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Furthermore, the described features, structures, or characteristics of the embodiments may be combined in any suitable manner. While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, those having ordinary skills in the art would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including."

What is claimed is:

1. A method performed by a first user equipment (UE) for wireless communication, the method comprising:
   receiving a beam failure recovery configuration that includes at least one candidate beam configured for sidelink beam failure recovery;
   transmitting an indication to a second UE to perform reception using the at least one candidate beam based on a number of consecutive non-acknowledgment (NACK) feedbacks reaching a threshold;
   in response to detecting a beam failure on sidelink between the first UE and the second UE in accordance with the indication, transmitting a beam failure recovery query (BFRQ) to the second UE on the at least one candidate beam included in the beam failure recovery configuration; and
   in response to receiving a beam failure recovery response (BFRR) from the second UE, selecting one or more new beams for sidelink transmission based on the BFRR.

2. The method of claim 1, wherein the beam failure is detected when the first UE is configured or preconfigured with the beam failure recovery configuration and a number of retransmissions from a sidelink radio link control (RLC) entity for the second UE reaches a threshold.

3. The method of claim 1, wherein the beam failure is detected when the first UE is configured or preconfigured with the beam failure recovery configuration and a number of consecutive hybrid automatic repeat request (HARQ) discontinuous transmissions (DTXs) or NACK feedbacks from the second UE reaches a threshold.

4. The method of claim 1, wherein the beam failure is detected when the first UE is configured or preconfigured with the beam failure recovery configuration and a configured or preconfigured detection timer expires.

5. The method of claim 1, wherein the BFRQ transmitted on the at least one candidate beam comprises a beam failure indication and a channel state information (CSI) reference signal (RS) corresponding to the at least one candidate beam.

6. The method of claim 1, wherein the BFRQ is at least one of transmitted on each candidate beam in a set of configured or preconfigured candidate beams, or transmitted on one or more candidate beams selected from the set of configured or preconfigured candidate beams.

7. The method of claim 1, further comprising:
   starting a configured or preconfigured recovery timer after transmitting the BFRQ;
   monitoring the BFRR on the at least one candidate beam while the recovery timer is running; and
   stopping the recovery timer when receiving the BFRR before the recovery timer expires.

8. The method of claim 1, wherein the BFRR comprises at least one channel state information (CSI) report, each CSI report corresponding to a candidate beam, and one or more candidate beams corresponding to the at least one CSI report are selected as the one or more new beams for sidelink transmission.

9. A first user equipment (UE) for wireless communication, comprising:
   at least one memory; and
   at least one processor coupled with the at least one memory and configured to cause the first UE to:
      receive an indication to perform reception using at least one candidate beam based on a number of consecutive non-acknowledgment (NACK) feedbacks reaching a threshold, the at least one candidate beam configured for sidelink beam failure recovery and included in a beam failure recovery configuration;

receive a beam failure recovery query (BFRQ) from a second UE on the at least one candidate beam in accordance with the indication;

transmit a beam failure recovery response (BFRR) to the second UE in response to the BFRQ; and determine one or more new beams for sidelink reception based on the BFRQ.

10. The first UE of claim 9, wherein the BFRQ received on each candidate beam comprises a beam failure indication and a channel state information (CSI) reference signal (RS) corresponding to the at least one candidate beam.

11. The first UE of claim 10, wherein the at least one processor is configured to cause the first UE to measure a CSI measurement for each CSI RS.

12. The first UE of claim 11, wherein the BFRR comprises at least one CSI report, each CSI report indicating the CSI measurement corresponding to the at least one candidate beam.

13. The first UE of claim 12, wherein, to determine the one or more new beams for sidelink reception based on the BFRQ, the at least one processor is configured to cause the first UE to select one or more candidate beams corresponding to one or more optimal CSI measurements of the at least one candidate beam as the one or more new beams for the sidelink reception.

14. A first user equipment (UE) for wireless communication, comprising:
at least one memory; and
at least one processor coupled with the at least one memory and configured to cause the first UE to:
receive a beam failure recovery configuration that includes at least one candidate beam configured for sidelink beam failure recovery;
transmit an indication for a second UE to perform reception using the at least one candidate beam based on a number of consecutive non-acknowledgment (NACK) feedbacks reaching a threshold;
in response to a beam failure detected on sidelink between the first UE and the second UE in accordance with the indication, transmit a beam failure recovery query (BFRQ) to the second UE on the at least one candidate beam included in the beam failure recovery configuration; and in response to receiving a beam failure recovery response (BFRR) from the second UE, select one or more new beams for sidelink transmission based on the BFRR.

15. The first UE of claim 14, wherein the beam failure is detected when the first UE is configured or preconfigured with the beam failure recovery configuration and a number of retransmissions from a sidelink radio link control (RLC) entity for the second UE reaches a threshold.

16. The first UE of claim 14, wherein the beam failure is detected when the first UE is configured or preconfigured with the beam failure recovery configuration and a number of consecutive hybrid automatic repeat request (HARQ) discontinuous transmissions (DTXs) or NACK feedbacks from the second UE reaches a threshold.

17. The first UE of claim 14, wherein the beam failure is detected when the first UE is configured or preconfigured with the beam failure recovery configuration and a configured or preconfigured detection timer expires.

18. The first UE of claim 14, wherein the BFRQ transmitted on each candidate beam comprises a beam failure indication and a channel state information (CSI) reference signal (RS) corresponding to the at least one candidate beam.

19. The first UE of claim 14, wherein the BFRQ is at least one of transmitted on each candidate beam in a set of configured or preconfigured candidate beams, or transmitted on one or more candidate beams selected from the set of configured or preconfigured candidate beams.

20. A method performed by a first user equipment (UE), the method comprising:
receiving an indication to perform reception using at least one candidate beam based on a number of consecutive non-acknowledgment (NACK) feedbacks reaching a threshold, the at least one candidate beam configured for sidelink beam failure recovery and included in a beam failure recovery configuration;
receiving a beam failure recovery query (BFRQ) from a second UE on the at least one candidate beam in accordance with the indication;
transmitting a beam failure recovery response (BFRR) to the second UE in response to the BFRQ; and
determining one or more new beams for sidelink reception based on the BFRQ.

* * * * *